(12) United States Patent
Blomquist

(10) Patent No.: US 6,902,637 B2
(45) Date of Patent: Jun. 7, 2005

(54) PROCESS FOR PREPARING FREE-FLOWING PARTICULATE PHASE STABILIZED AMMONIUM NITRATE

(75) Inventor: Harold R. Blomquist, Gilbert, AZ (US)

(73) Assignee: TRW Inc., Lyndhurst, OH (US)

(*) Notice: Subject to any disclaimer, the term of this patent is extended or adjusted under 35 U.S.C. 154(b) by 69 days.

(21) Appl. No.: 09/767,567

(22) Filed: Jan. 23, 2001

(65) Prior Publication Data

US 2002/0096235 A1  Jul. 25, 2002

(51) Int. Cl.[7] .......................... C06B 21/00; C06B 31/28
(52) U.S. Cl. ..................................... 149/109.6; 149/46
(58) Field of Search ................................ 149/46, 109.6

(56) References Cited

U.S. PATENT DOCUMENTS

| | | | |
|---|---|---|---|
| 3,452,445 A | | 7/1969 | Higgins |
| 3,639,184 A | * | 2/1972 | Grant ............................ 149/18 |
| 3,685,163 A | | 8/1972 | Olt |
| 3,819,336 A | | 6/1974 | Rogers et al. |
| 3,892,610 A | | 7/1975 | Huzinec |
| 4,124,368 A | | 11/1978 | Boyars |
| 4,177,227 A | | 12/1979 | Harvey et al. |
| 4,481,048 A | | 11/1984 | Cady et al. |
| 4,907,368 A | | 3/1990 | Mullay et al. |
| 5,098,683 A | * | 3/1992 | Mehrotra et al. ............. 149/46 |
| 5,545,272 A | * | 8/1996 | Poole et al. .................. 149/48 |
| 5,567,910 A | | 10/1996 | Chattopadhyay |
| 5,624,597 A | * | 4/1997 | Buhl et al. ................... 210/781 |
| 5,665,276 A | | 9/1997 | Kirby et al. |
| 5,720,794 A | | 2/1998 | Tortorelli |
| 5,872,329 A | * | 2/1999 | Burns et al. .................. 149/46 |
| 6,210,505 B1 | * | 4/2001 | Khandhadia et al. ......... 149/46 |
| 6,277,296 B1 | * | 8/2001 | Scheffee et al. ......... 149/109.2 |
| 6,296,724 B1 | * | 10/2001 | Blomquist .................... 149/46 |
| 6,306,232 B1 | * | 10/2001 | Khandhadia et al. ......... 149/22 |
| 6,315,930 B1 | * | 11/2001 | Hamilton ...................... 149/46 |
| 6,319,341 B1 | * | 11/2001 | Blomquist ............... 149/19.92 |
| 6,641,622 B2 | * | 11/2003 | Sampson et al. ............. 149/46 |
| 2002/0098143 A1 | * | 7/2002 | Sampson et al. ........... 423/396 |

OTHER PUBLICATIONS

Arcitlce entitled "An X–Ray Diffractometric Study of the–Ammonium Nitrate Potassium Nitrate System", pp. 2135–2140 (1965).

* cited by examiner

*Primary Examiner*—John R. Hardee
(74) *Attorney, Agent, or Firm*—Tarolli, Sundheim,. Covell & Tummino L.L.P.

(57) ABSTRACT

A process for preparing free-flowing, phase-stabilized ammonium nitrate comprises the following steps. A solution of ammonium nitrate (12), a surfactant (13), a phase stabilizer (26), and an inert liquid (20) is prepared. The solution is atomized to form a stream of droplets. The droplets are freeze-dried to form agglomerates (54) of crystals of phase stabilized ammonium nitrate. The crystals of phase stabilized ammonium nitrate in the agglomerates are coated with a film comprising the surfactant. The agglomerates are disintegrated into separated free-flowing phase stabilized ammonium nitrate in the agglomerates crystals coated with a film comprising the surfactant.

14 Claims, 1 Drawing Sheet

PROCESS FOR PREPARING FREE-FLOWING PARTICULATE PHASE STABILIZED AMMONIUM NITRATE

FIELD OF THE INVENTION

The present invention relates to a process for preparing free-flowing, particulate, phase-stabilized ammonium nitrate. The free-flowing, phase-stabilized ammonium nitrate is particularly useful in a gas generating composition for inflating a vehicle occupant protection device.

BACKGROUND OF THE INVENTION

An inflator for inflating an inflatable vehicle occupant protection device, such as an air bag, contains an ignitable gas generating composition. The inflator includes an igniter. The igniter is actuated so as to ignite the gas generating composition when the vehicle experiences a collision for which inflation of the air bag is desired to help protect a vehicle occupant. As the gas generating composition burns, it generates a volume of inflation gas. The inflation gas is directed into the air bag to inflate the air bag. When the air bag is inflated, it expands into the vehicle occupant compartment and helps to protect the vehicle occupant.

A gas generating composition that uses particulate ammonium nitrate as an oxidizer source has the advantage that it produces upon combustion high gas outputs and low levels of residual solids. Particulate ammonium nitrate agglomerates, however, and forms clumps that must be mechanically broken prior to using the particulate ammonium nitrate in a gas generating composition. A typical method of mechanically breaking the clumps of ammonium nitrate is by grinding the clumps of ammonium nitrate in a ball mill. Ammonium nitrate is hygroscopic and can potentially absorb moisture from the air during the grinding process. The absorbed moisture can potentially render the particulate ammonium nitrate unsuitable for use in a gas generating composition for inflating an inflatable vehicle occupant protection device.

SUMMARY OF THE INVENTION

The present invention is a process for preparing free-flowing, phase stabilized ammonium nitrate. The process comprises preparing a solution of ammonium nitrate, a surfactant, a phase stabilizer, and an inert liquid. The solution is atomized to form a stream of droplets. The droplets are freeze-dried to form agglomerates of crystals of phase stabilized ammonium nitrate. The crystals of phase stabilized ammonium nitrate in the agglomerates are coated with a film comprising the surfactant. The agglomerates are disintegrated into separated free-flowing, phase stabilized ammonium nitrate crystals. The separated free-flowing, phase stabilized ammonium nitrate crystals are coated with a film comprising the surfactant.

BRIEF DESCRIPTION OF THE DRAWINGS

The foregoing and other features of the present invention will become more apparent to one skilled in the art upon consideration of the following description of the invention and the accompanying drawing in which.

DESCRIPTION OF THE PREFERRED EMBODIMENTS

Figure 1:
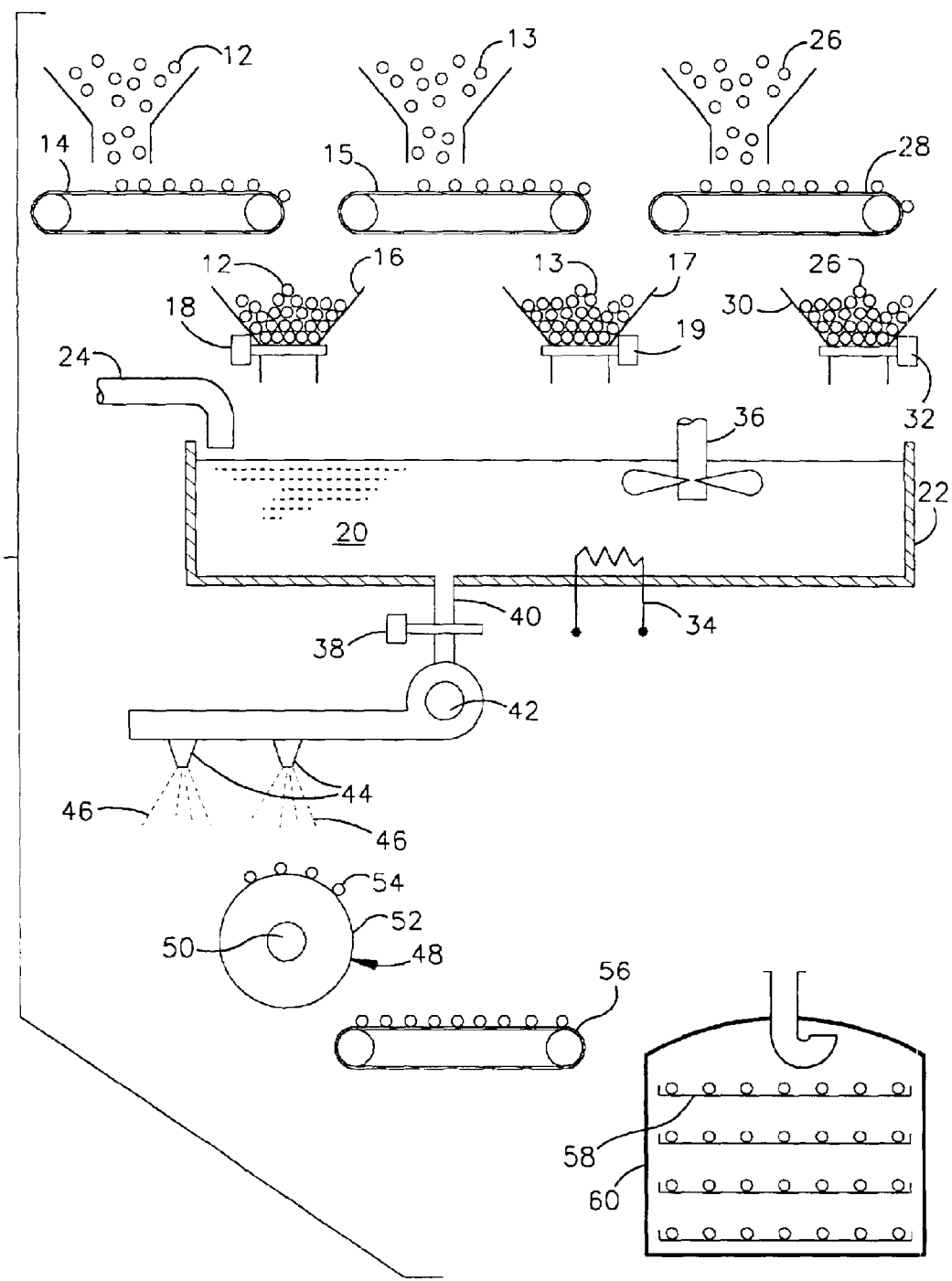
FIG. 1 is a schematic view of the process of the present invention.

A process for preparing free-flowing, phase stabilized ammonium nitrate is illustrated schematically in FIG. 1. The process begins with obtaining a desired quantity of ammonium nitrate. Ammonium nitrate is a hygroscopic, white, crystalline salt, which produces upon combustion about 1.70 J/g of heat. The quantity of ammonium nitrate is in the form of particles 12. The particles 12 of ammonium nitrate are placed on belt 14 and fed into a hopper 16. The hopper 16 has an outlet valve 18. When the outlet valve 18 is opened, the particles 12 of ammonium nitrate flow from the hopper 16 into an inert liquid 20 contained in a mixing tank 22. By inert liquid, it is meant a liquid that does not chemically react with the ammonium nitrate.

The inert liquid 20 is introduced into the mixing tank 22 from a fluid line 24. The inert liquid 20 can be any inert liquid capable of dissolving the ammonium nitrate. Examples of inert liquids, which can be used in the present invention, are water and liquid carbon dioxide. A preferred inert liquid is water. Water is inexpensive, non-toxic, and readily dissolves ammonium nitrate.

The amount of ammonium nitrate introduced into the inert liquid 20 is that amount effective to form a concentrated solution with the inert liquid 20. By concentrated solution, it is meant that the weight percent of ammonium nitrate in the inert liquid is greater than about 50% by weight of the solution but less than the weight percent of ammonium nitrate effective to saturate the solution at room temperature (i.e., about 25° C.).

Alternatively, the ammonium nitrate can be introduced into the mixing tank 22 in the form of a concentrated ammonium nitrate solution from fluid line 24. The weight percent of ammonium nitrate in the concentrated solution is greater than about 50% based on the weight of the solution but below the weight percent of ammonium nitrate effective to saturate the solution at room temperature (i.e., about 25° C.)

A predetermined quantity of surfactant is provided. A surfactant is any substance that lowers surface reactivity of the ammonium nitrate and minimizes agglomeration of the ammonium nitrate during storage of the phase stabilized ammonium nitrate prepared by the process of the present invention. Examples of surfactants are amides of carboxylates such as amide isotearate, polyvinyl pyrrolidone copolymers, and metal carboxylates. A preferred surfactant is GANEX, a polyvinyl pyrrolidone commercially available from GAF Corporation.

The quantity of surfactant is in the form of particles 13. The particles 13 of surfactant are placed on belt 15 and fed into hopper 17. Hopper 17 has an outlet valve 19. When the outlet valve 19 is opened, the particles 13 of surfactant flow into the solution of ammonium nitrate and inert liquid contained in the mixing tank 22.

The amount of surfactant is that amount effective to lower the surface reactivity of the ammonium nitrate and minimize agglomeration of the phase stabilized ammonium nitrate during storage of the particulate ammonium nitrate prepared by the process of the present invention. A preferred amount of surfactant is from about 0.01% to about 0.15% by weight, based on the combined weight of the ammonium nitrate and the surfactant. A more preferred amount of surfactant is less than about 0.1% by weight, based on the combined weight of the ammonium nitrate and the surfactant.

A predetermined quantity of a phase stabilizer is also provided. A phase stabilizer is a material that when combined with pure ammonium nitrate is effective at minimizing the volumetric and structural changes associated with phase transitions of pure ammonium nitrate. Examples of phase stabilizers that can be used in the present invention are metal salts and metal oxides, which are soluble in the inert liquid. Preferred phase stabilizers include potassium salts such as potassium nitrate, potassium oxalate, potassium dichromate, and mixtures thereof.

The quantity of phase stabilizer is in the form of particles 26. The particles 26 of phase stabilizer are placed on belt 28 and fed into hopper 30. Hopper 30 has an outlet valve 32. When the outlet valve 32 is opened, the particles 26 of phase stabilizer flow into the solution of ammonium nitrate, surfactant, and inert liquid contained in the mixing tank 22.

The amount of phase stabilizer introduced into the solution of ammonium nitrate, surfactant, and inert liquid is that amount effective to phase stabilize the ammonium nitrate for use in an inflator of a vehicle occupant protection apparatus. This amount can vary depending on the particular phase stabilizer used. If the phase stabilizer is potassium nitrate, the amount of phase stabilizer introduced into the solution of ammonium nitrate and inert liquid is about 10% to about 20% by weight, based on the combined weight of the ammonium nitrate and the phase stabilizer.

The solution of ammonium nitrate, surfactant, phase stabilizer, and inert liquid is heated by a heating element 34 and stirred using a high-speed mixer 36 until a viscous solution is formed that has the consistency of a viscous syrup. The temperature to which the solution is heated is that temperature effective to prevent the ammonium nitrate, surfactant, and phase stabilizer from precipitating out of solution but below the boiling point of the solution. When water is used as the inert liquid for the solution, this temperature is about 38° C. The specific viscosity of the viscous solution is not critical other than that the solution has to be capable of being atomized.

The mixing tank 22 has an outlet valve 38. The outlet valve 38 is in a fluid outlet line 40 of the mixing tank 22. When the outlet valve 38 is opened, the solution of ammonium nitrate, surfactant, phase stabilizer, and inert liquid is pumped by a pump 42 to an atomizing means 44. The atomizing means 44 atomizes the solution of ammonium nitrate, surfactant, phase stabilizer, and inert liquid. The atomizing means 44 can be any atomizing means 44 typically used in atomizing liquids. Examples of atomizing means are pressure nozzles and high speed rotating disks, both of which are known in the art.

The atomizing means 44 forms streams of spheroid droplets 46 of the solution of ammonium nitrate, surfactant, phase stabilizer and the inert liquid. The spheroid droplets 46 have an average diameter in the range of about 50 $\mu$m to about 100 $\mu$m.

The spheroid droplets 46 are then freeze-dried. By freeze-drying, it is meant a method of removing the inert liquid from the spheroid droplets by first freezing the spheroid droplets and then placing the frozen droplets in a vacuum so that the frozen inert liquid vaporizes in the vacuum without melting.

In the freeze-drying process of the present invention, the spheroid droplets are directed to a cooling means, which cools the spheroid droplets 46 to a temperature below the freezing point of the solution of ammonium nitrate, surfactant, phase stabilizer, and inert liquid. In one embodiment of the present invention, the cooling means is a cylindrical drum 48, which has a longitudinal central axis 50 and an outer cylindrical surface 52. The drum 48 rotates about the axis 50. The outer cylindrical surface 52 of the drum 48 has a surface temperature below about −130° C. The temperature of the outer cylindrical surface 52 of the drum 48 is maintained below about −130° C. by passing a cooling medium (not shown) through a plurality of coils (not shown) positioned within the drum 48. The cooling medium can be a liquid such as liquid air, liquid helium, or liquid nitrogen. The temperature of the cooling medium is below about −130° C. The cooling medium may advantageously be recycled through a refrigeration means or cooled by a recycled refrigerated fluid in a known manner.

The spheroid droplets 46 are directed against the outer cylindrical surface 52 of the drum 48. The spheroid droplets 46 contact the outer cylindrical surface of the drum, flatten, and instantly freeze. The frozen droplets 54 have a flattened configuration and an irregular crystal structure. The outer cylindrical surface 52 of the drum 48 is made from a non-stick material, such as TEFLON®, to reduce adherence of the frozen droplets 54 to the drum 48.

The frozen droplets 54 are collected from the outer cylindrical surface 52 of the drum 48 by scraping the drum 48 with a scraping member (not shown) positioned adjacent to the outer cylindrical surface 52 of the drum 48. The scraping member continuously scrapes the frozen droplets 54 from the outer cylindrical surface 52 as the drum 48 rotates. The scraped frozen droplets 54 are placed on belt 56 and transferred to drying trays 58. During the transfer, the frozen droplets 54 are maintained by a cooling means (not shown) at a temperature below the melting point of the frozen droplets 54.

In another embodiment of the present invention, the cooling means is a liquid cooling medium. Examples of liquid cooling mediums that can be used in the present invention are liquid air, liquid helium, and liquid nitrogen. The liquid cooling medium may advantageously be recycled through a refrigeration means or cooled by a recycled refrigerated fluid in a known manner. The spheroid droplets 46 are directed into the liquid cooling medium. When, the spheroid droplets 46 contact the liquid cooling medium, they instantly freeze. The frozen droplets are spherical in shape and have a uniform crystal structure. The frozen droplets are sieved from the liquid cooling medium. The sieved frozen droplets are placed on belt 56 and transferred to the drying trays 58. During the transfer, the frozen droplets 54 are maintained by a cooling means (not shown) at a temperature below the melting point of the frozen droplets 54.

After the frozen droplets 54 of ammonium nitrate, surfactant, phase stabilizer, and inert liquid have been transferred to drying trays 58, they are dried. In the drying step of the freeze-drying process, the drying trays 58 with the frozen droplets 54 are placed in a vacuum chamber 60. The frozen droplets 54 in the vacuum chamber 60 are subjected to pressure and temperature conditions at which the inert liquid is removed from the frozen droplets 54 by sublimation. Sublimation of the frozen droplets is performed at a pressure in the vacuum chamber 60 maintained below the triple point pressure of the inert liquid, which for water is 6.11 millibar. Preferably, the pressure is maintained in the vacuum chamber 60 at about 0.1 to about 2 millibars. The frozen droplets 54 are also heated to supply the heat of sublimation of the inert liquid and increase the vapor pressure without melting any of the components of the frozen droplets 54. Optimum drying rates are achieved when all areas of the frozen droplets 54 are dried evenly and when the heat flux in the drying frozen droplets 54 is sufficient to keep the drying surface temperature just slightly below the melting point of the frozen inert liquid. As the drying surfaces of the frozen droplets 54 recede, the heating temperature must be increased because the frozen droplets 54 are in effect being insulated with a coating of the dried product.

The phase stabilized ammonium nitrate so formed by sublimation of the frozen droplets comprises agglomerates of crystals of phase stabilized ammonium nitrate. The crystals of phase stabilized ammonium nitrate are coated with a film of the surfactant. The weight ratio of ammonium nitrate and the phase stabilizer present in each crystal of phase stabilized ammonium nitrate is the same as the weight ratio that was present in the solution of ammonium nitrate and phase stabilizer. The crystals of phase stabilized ammonium nitrate have an average diameter that ranges from about 1 $\mu$m to about 20 $\mu$m and a surface area from about 0.7 meters squared per gram to about 0.9 meters squared per gram.

If water is used as the inert liquid in the process of the present invention, the phase stabilized ammonium nitrate so formed has a moisture level below 0.03% by weight of the phase stabilized ammonium nitrate. Preferably, the phase stabilized ammonium nitrate so formed has a moisture level below about 0.01% by weight of the phase stabilized ammonium nitrate.

The agglomerates of phase stabilized ammonium nitrate are then disintegrated by known grinding means (not shown) into separated free-flowing phase stabilized ammonium nitrate crystals. The separated free-flowing phase stabilized ammonium nitrate is coated with a film that comprises the surfactant. The average size of the phase stabilized ammonium nitrate crystals is about 1 $\mu$m to about 20 $\mu$m. The phase stabilized ammonium nitrate crystals have a surface area from about 0.7 meters squared per gram to about 0.9 meter squared per gram. The disintegration must be performed in a low moisture environment to prevent absorption of moisture from the atmosphere by the phase stabilized ammonium nitrate.

The free-flowing, phase stabilized ammonium nitrate crystals are resistant to agglomeration and clumping during transfer and storage. As a result, the free-flowing, phase stabilized ammonium nitrate crystals formed by the process of the present invention are particularly useful in a gas generating composition for inflating a vehicle occupant protection device, such as illustrated schematically in FIG. 2.

Figure 2:
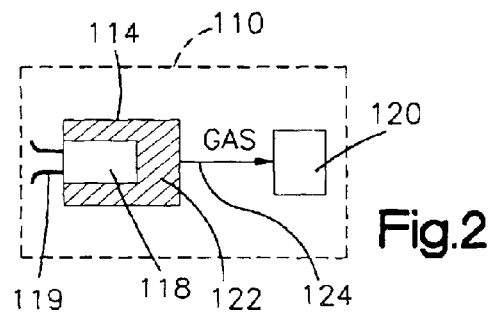
FIG. 2 is a schematic illustration of an apparatus employing a gas generating composition prepared according to the process of the present invention.

Referring to FIG. 2, an apparatus 110 comprises an inflator 114. The inflator 114 contains the gas generating composition 122. The gas generating composition 122 is ignited by an igniter 118 operatively associated with the gas generating composition 122. Electric leads 119 convey current to the igniter 118 as part of an electric circuit that includes a sensor (not shown) responsive to vehicle deceleration above a predetermined threshold. The apparatus 110 also comprises a vehicle occupant protection device 120. A gas flow means 124 conveys gas, which is generated by combustion of the gas generating composition 122 in the inflator 114, to the vehicle occupant protection device 120.

A preferred vehicle occupant protection device 120 is an air bag, which is inflatable to help protect a vehicle occupant in the event of a collision. Other vehicle occupant protection devices that can be used are inflatable seat belts, inflatable knee bolsters, inflatable air bags to operate knee bolsters, inflatable head liners, and inflatable side curtains.

The gas generating composition 122 comprises an intimate mixture of the phase stabilized ammonium nitrate, a fuel, and a binder. The amount of phase stabilized ammonium nitrate in the gas generating composition 122 is that amount necessary to achieve sustained combustion of the gas generating composition. The amount of phase stabilized ammonium nitrate necessary to achieve sustained combustion of the gas generating composition 122 is about 60% to about 80% by weight of the gas generating composition 122. More preferably, the amount of phase stabilized ammonium nitrate in the gas generating composition 122 is about 65% to about 75% by weight of the gas generating composition.

The fuel of the gas generating composition 122 can be any non-azide nitrogen containing fuel commonly used in a gas generating composition 122 for inflating a vehicle occupant protection device 120. The non-azide nitrogen containing fuel is a material capable of undergoing rapid and substantially complete oxidation upon combustion of the gas generating composition. In one embodiment of the present invention, the non-azide nitrogen containing fuel is selected from the group consisting of cyclotrimethylenetrinitramine (RDX), cyclotetramethylenetetranitramine (HMX), and mixtures of cyclotetramethylenetetranitramine and cyclotrimethylenetrinitramine.

The non-azide nitrogen containing fuel can also be other non-azide nitrogen containing fuels typically used in a gas generating composition for inflating a vehicle occupant protection device 120, including: cyanamides such as dicyanamide and salts of cyanamides; tetrazoles such as 5-aminotetrazole and derivatives and salts of tetrazoles; carbonamides such as azo-bis-dicarbonamide and salts of carbonamide; triazoles such as 3-nitro-1,2,4-triazole-5-one (NTO) and salts of triazoles; guanidines such as nitroguanidine (NQ) and salts of guanidines; tetramethyl ammonium nitrate; urea and salts of urea; and mixtures thereof.

The fuel is incorporated in the gas generating composition 122 in the form of particles. The average particle size of the fuel is from about 1 $\mu$m to about 100 $\mu$m. Preferably, the average particle size of the fuel is from about 1 $\mu$m to about 20 $\mu$m.

The amount of fuel in the gas generating composition 122 is that amount necessary to achieve sustained combustion of the gas generating composition 122. The amount can vary depending upon the particular fuel involved and other reactants. A preferred amount of fuel is in the range of about 15% to about 35% by weight of the gas generating composition 122. More preferably, the amount of fuel in the gas generating composition 122 is from about 20% to about 30% by weight of the gas generating composition 122.

The binder of the gas generating composition 122 of the present invention is an elastomeric binder. Suitable elastomeric binders for binding the particles of the fuel and the particles of ammonium nitrate in an intimate mixture are well known in the art. Examples of elastomeric binders are cellulose based elastomers such as cellulose acetate butyrate (CAB), polycarbonate based elastomers, polyurethane based elastomers, polyester based elastomers, polyether based elastomers, polysuccinate based elastomers, polybutadiene based elastomers, polystyrene based elastomers, and mixtures thereof. A more preferred elastomeric binder is "KRATON", a polyethylene/butylene-polystyrene block copolymer manufactured by KRATON Inc.

A preferred amount of binder in the gas generating composition 122 is from about 1% to about 15% by weight of the gas generating composition 122. More preferably, the amount of binder is from about 2.5% to about 6% by weight of the gas generating composition 122.

The gas generating composition 122 of the present invention may also comprise other ingredients commonly added to a gas generating composition 122 for providing inflation gas for inflating an inflatable vehicle occupant protection device. Examples of such other ingredients are supplemental oxidizers, plasticizers, burn rate modifiers, coolants, and ignition aids, all in relatively small amounts (i.e., less than about 10% by weight of the gas generating composition).

Preferably, the components of the gas generating composition 122 are present in a weight ratio adjusted to produce upon combustion a gas product that is essentially free of carbon monoxide. By essentially free of carbon monoxide, it is meant that the amount of carbon monoxide in the combustion gas product is less than 4% by volume of the gas product.

The gas generating composition 122 is prepared by mixing the phase-stabilized ammonium nitrate, the fuel, the binder, and the other ingredients (if utilized) with a non-aqueous liquid. The non-aqueous liquid must be capable of dissolving the binder but not dissolving the particulate phase-stabilized ammonium nitrate and the fuel. Examples of non-aqueous liquids suitable for use in the present invention are toluene, acetone, and methylene chloride.

The phase stabilized ammonium nitrate, the fuel, the binder, and the other ingredients (if utilized) are stirred until the phase stabilized ammonium nitrate and the fuel are uniformly dispersed and a viscous suspension is formed. The surfactant, which coats the particles of phase-stabilized ammonium nitrate, facilitates dispersion of the phase-stabilized ammonium nitrate in the suspension.

The viscous suspension is spray dried using known spraying drying techniques to produce spheroid particles of gas generating material. The spheroid particles of gas generating material comprise particles of the phase stabilized ammonium nitrate, the fuel and other ingredients (if utilized) encapsulated with the binder.

The particulate gas generating material is then compacted into the configuration of an aspirin shaped tablet or any other desired configuration.

EXAMPLE

Phase stabilized ammonium nitrate was prepared by mixing 59 grams of ammonium nitrate with 41 ml of water in a commercial mixer. The ammonium nitrate and water were stirred until a 59% by weight aqueous ammonium nitrate solution was formed. 0.05 grams of GANEX, a polyvinyl pyrrolidone surfactant commercially available from GAF Corporation, was added to the solution ammonium nitrate and water. 11 grams of potassium nitrate were added to the solution of ammonium nitrate and surfactant, and the solution was stirred until a 63% by weight aqueous solution of ammonium nitrate and potassium nitrate was formed.

The aqueous solution of ammonium nitrate, GANEX, and potassium nitrate was heated to a temperature of about 38° C. and pumped through a fluid nozzle to form a stream of spheroid droplets having an average diameter of about 50 $\mu$m to about 100 $\mu$m. The stream of spheroid droplets was directed against the outer cylindrical surface of a rotating drum. The outer cylindrical surface of the rotating drum had a temperature of about −140° C. The temperature of the outer cylindrical surface was achieved by pumping liquid nitrogen through a plurality of coils within the rotating drum. Upon contact with the outer cylindrical surface of the rotating drum, the spheroid drops instantly froze.

While being maintained at a temperature below their melting point, the frozen droplets were scraped from the outer cylindrical surface of the rotating drum and transferred to drying trays. The drying trays were inserted into a vacuum chamber. The pressure within the vacuum chamber was reduced to a pressure of about 0.1 millibar. The water in the frozen droplets was then removed by sublimation to produce agglomerates of crystals of phase stabilized ammonium nitrate. The crystals of phase stabilized ammonium nitrate were coated with a film of GANEX. The crystals of phase stabilized ammonium nitrate comprised about 84% by weight ammonium nitrate and about 16% by weight potassium nitrate. The crystals of phase stabilized ammonium nitrate had an average diameter of about 1 $\mu$m to about 20 $\mu$m and a surface area of about 0.7 meters squared per gram to about 0.9 meters squared per gram.

The agglomerates of phase stabilized ammonium nitrate were removed from the vacuum chamber and placed in a ball mill. The agglomerates of crystals of phase stabilized ammonium nitrate were disintegrated into separated free-flowing phase stabilized ammonium nitrate crystals. The phase stabilized ammonium nitrate crystals had an average particle of about 1 $\mu$m to about 20 $\mu$m and a surface area of about 0.7 meters squared per gram to about 0.9 meters squared per gram. The disintegration of the agglomerates of phase stabilized ammonium nitrate was performed in a low moisture environment to prevent the phase stabilized ammonium nitrate from absorbing any moisture.

A moisture analysis of the phase stabilized ammonium nitrate was performed. The phase stabilized ammonium nitrate included 0.00132% by weight water.

The phase stability of the phase stabilized ammonium nitrate at varying temperatures was determined using a differential scanning calorimeter (DSC). The phase stabilized ammonium nitrate exhibited no exotherms from a temperature of about −100° C. to a temperature of about 118° C.

From the above description of the invention, those skilled in the art will perceive improvements, changes and modifications. Such improvements, changes and modifications within the skill of the art are intended to be covered by the appended claims.

Having described the invention the following is claimed:

1. A process for preparing a free-flowing, phase-stabilized ammonium nitrate, said process comprising the following steps:

preparing a solution of ammonium nitrate, a surfactant, an inert liquid, and an ammonium nitrate phase stabilizer, said ammonium nitrate, said surfactant, and said phase stabilizer being soluble in said inert liquid, the amount of surfactant in said solution being about 0.01% to about 0.15% based on the combined weight of the ammonium nitrate and the surfactant;

atomizing the solution to form a stream of droplets, the droplets having an average diameter of about 50 $\mu$m to about 100 $\mu$m;

freezing said stream of droplets by contacting said stream of droplets with an outer surface of a drum, said surface being maintained at temperature below the freezing point of said solution by passing a cooling medium through the interior of the drum;

sublimating the frozen droplets to remove the inert liquid from the frozen droplets and form agglomerates of the phase stabilized ammonium nitrate; and disintegrating the agglomerates into separated free-flowing phase stabilized ammonium nitrate crystals coated with a film comprising a surfactant.

2. The process of claim 1 wherein the inert liquid is water.

3. The process of claim 2 wherein the surfactant is a polyvinyl pyrrolidone.

4. The process of claim 1 wherein the phase stabilized ammonium nitrate crystals have an average diameter of about 1 $\mu$m to about 20 $\mu$m.

5. The process of claim 1 wherein the phase stabilizer comprises potassium nitrate.

6. A process for preparing phase-stabilized ammonium nitrate comprising the steps of:
preparing an aqueous solution of ammonium nitrate, a surfactant, and potassium nitrate, the amount of surfactant in said solution being about 0.01% to about 0.15% based on the combined weight of the ammonium nitrate and the surfactant;
atomizing the aqueous solution to form a stream of droplets, the droplets having an average diameter of about 50 $\mu$m to about 100 $\mu$m;
freezing said stream of droplets by contacting said stream of droplets with an outer surface of a drum, said surface being maintained at temperature below the freezing point of said solution by passing a cooling medium through the interior of the drum;
sublimating the frozen droplets to remove the water from the frozen droplets to form agglomerates of crystals of phase stabilized ammonium nitrate, said crystals of phase stabilized ammonium nitrate in the agglomerates being coated with a film of surfactant; and
disintegrating the agglomerates into separated free-flowing phase stabilized ammonium nitrate crystals coated with a film comprising the surfactant.

7. The process of claim 6 wherein the phase stabilized ammonium nitrate crystals have an average diameter of about 1 $\mu$m to about 20 $\mu$m.

8. A process for preparing a free-flowing, phase-stabilized ammonium nitrate, said process comprising the following steps:
preparing a solution of ammonium nitrate, a surfactant, an inert liquid, and an ammonium nitrate phase stabilizer, said ammonium nitrate, said surfactant, and said phase stabilizer being soluble in said inert liquid;
atomizing the solution to form a stream of droplets;
freezing said stream of droplets by contacting said stream of droplets with an outer surface of a drum, said surface being maintained at temperature below the freezing point of said solution by passing a cooling medium through the interior of the said drum;
sublimating the frozen droplets to remove the inert liquid from the frozen droplets and form agglomerates of the phase stabilized ammonium nitrate; and
disintegrating the agglomerates into separated free-flowing phase stabilized ammonium nitrate crystals coated with a film comprising the surfactant.

9. The process of claim 8 wherein the inert liquid is water.

10. The process of claim 8 wherein the surfactant is a polyvinyl pyrrolidone.

11. The process of claim 8 wherein the phase stabilized ammonium nitrate crystals have an average diameter of about 1 $\mu$m to about 20 $\mu$m.

12. The process of claim 8 wherein the amount of surfactant in the solution is from about 0.01% to about 0.15% based upon the combined weight of the ammonium nitrate and the surfactant.

13. The process of claim 8 wherein the phase stabilizer comprises potassium nitrate.

14. A process for preparing a free-flowing, phase-stabilized ammonium nitrate, said process comprising the following steps:
preparing a solution of ammonium nitrate, polyvinyl pyrrolidone, an inert liquid, and an ammonium nitrate phase stabilizer, the ammonium nitrate, the polyvinyl pyrrolidone, and the phase stabilizer being soluble in the inert liquid;
atomizing the solution to form a stream of droplets;
freeze-drying the droplets to form agglomerates of crystals of phase stabilized ammonium nitrate, the crystals of phase stabilized ammonium nitrate in the agglomerates being coated with a film comprising the polyvinyl pyrrolidone; and
disintegrating the agglomerates into separated free-flowing phase stabilized ammonium nitrate crystals coated with a film comprising the polyvinyl pyrrolidone.

* * * * *